United States Patent Office 3,231,532
Patented Jan. 25, 1966

3,231,532
ORGANOPOLYSILOXANE SYSTEM
Frank J. Modic, Scotia, N.Y., assignor to General Electric Company, a corporation of New York
No Drawing. Filed Feb. 18, 1963, Ser. No. 259,360
2 Claims. (Cl. 260—29.1)

This invention relates to improved organopolysiloxane coating systems and in particular to organopolysiloxane coating systems useful for coating cooking utensils to facilitate the release of cooked goods therefrom.

The use of various types of organopolysiloxanes for coating cooking utensils such as bread pans and skillets and the like is well known in the art. Illustrative of patents showing the use of silicones for coating cooking utensils are U.S. Patents 2,606,510, 2,462,242, 2,833,441 and 3,002,946. While the various types of organopolysiloxanes and organosiloxane systems described in the aforementioned patents have had some degree of commercial success, the problems associated with the use of these silicone resins and with cooking utensils coated with these resins have caused concern. In order to have optimum utility as a coating for cooking utensils, an organopolysiloxane must form a uniform coat on the surface to which it is applied, the coating must adhere uniformly to all parts of the cooking utensil, the coating must be stable at elevated temperatures, the coating must be resistant to abrasion, and the coating must give consistent release on repeated use, regardless of the food variety which is cooked in the treated cooking utensil. A coating composition having all of these properties is eminently suitable for cooking foods without the necessity for using any type of grease.

While these desirable objectives for a polysiloxane coating composition for cooking utensils have been known in the art, the coating compositions heretofore developed have been deficient in at least one of the above-mentioned requirements.

It is an object of the present invention to provide an improved organopolysiloxane coating composition.

It is a further object of the present invention to provide an improved polysiloxane system which is useful in the coating of cooking utensils and which avoids the disadvantages of the prior art coating systems.

These and other objectives of my invention will be best understood by reference to the following detailed description of my invention.

My invention is based on the discovery of a specific organopolysiloxane system useful for coating cooking utensils which comprises, by weight (1) 100 parts of a methylphenylpolysiloxane resin containing an average of from 1.1 to 1.5 total methyl and phenyl radicals per silicon atom with from about 30 to 70 percent of the total methyl and phenyl radicals being phenyl radicals, (2) from 0.5 to 6 parts of a methylphenylpolysiloxane fluid comprising principally dimethylsiloxane units and diphenylsiloxane units and having a viscosity of from about 5,000 to 500,000 centistokes when measured at 25° C. and containing an average of at least 2.0 total methyl and phenyl radicals per silicon atom with about 5.0% to 20.0% of the total methyl and phenyl radicals being phenyl radicals, (3) from about 0.01 to 0.1 part of a trimethylsilyl chain-stopped methylpolysiloxane fluid having a viscosity of from about 100 to 10,000 centistokes when measured at 25° C. and (4) up to about 6 parts of a methylphenypolysiloxane fluid comprising principally dimethylsiloxane units and methylphenylsiloxane units and having a viscosity of from about 100 to 50,000 centistokes when measured at 25° C. and containing an average of at least 2.0 total methyl and phenyl radicals per silicon atom with from about 2.0 to 6.0 percent of the total methyl and phenyl radicals being phenyl radicals. The coating composition described above can be readily applied to the surface of a cooking utensil and cured by heating for a period of from 1 to 3 hours at a temperature in the range of from about 400 to 425° F.

The methylphenylpolysiloxane resin (1) employed in the coating composition of the present invention is of a type well known in the art which is conventionally prepared by the cohydrolysis and cocondensation of a mixture of one or more organotrichlorosilanes and one or more diorganodichlorosilanes. More particularly, these siloxane resins are conventionally copolymers containing monomethylsiloxane units, monophenylsiloxane units, dimethylsiloxane units, diphenylsiloxane units and phenylmethylsiloxane units with the various units selected in proportions so that the resulting resin contains an average of from 1.1 to 1.5 total methyl and phenyl radicals per silicon atom with from 30 to 70 percent of the total silicon-bonded methyl and phenyl radicals being phenyl radicals. While the conventional method of preparing siloxane resin (1) is as previously described, it is possible, although not particularly desirable, to include minor amounts, for example, up to about 10 mole percent of monoethylsiloxane units, ethylmethylsiloxane units, ethylphenylsiloxane units, diethylsiloxane units and various triorganosiloxane units and $SiO_2$ units in the polysiloxane resin. Where such other units are employed, the ratios of the various siloxane units are controlled so that the total ratio of organic radicals to silicon atoms is still in the range of from 1.1 to 1.5 total organic radicals per silicon atom with from 30 percent to 70 percent of the total organic radicals being phenyl radicals.

Methylphenylpolysiloxane fluid (2) is of a type well known in the art. Many of such fluids are described in Patents 2,469,888, 2,469,890 and 2,483,158. The methylphenylpolysiloxane fluid (2) is composed principally of dimethylsiloxane units and diphenylsiloxane units with the proportions of the ingredients being selected so that from 5.0 to 20.0 percent of the total silicon-bonded methyl and phenyl radicals are phenyl radicals. The fluid can also be chain-stopped with trimethylsiloxane units in sufficient amount to produce a material having a viscosity of from about 5,000 to 500,000 centistokes when measured at 25° C. In addition, methylphenylpolysiloxane fluid (2) can be free of trimethylsiloxane units or can contain minor amounts, e.g., up to about 10 mole percent, of methylphenylsiloxane units, monomethylsiloxane units, monophenylsiloxane units and triphenylsiloxane units so long as the proportions of ingredients are selected so that there are present at least 2.0, e.g., from 2.000 to 2.0005, total methyl and phenyl radicals per silicon atom and so that the viscosity is in the range of from 5,000 to 500,000 and so long as from 5.0 to 20.0 percent of the total phenyl and methyl radicals are phenyl radicals. Furthermore, it is possible to replace some of the silicon-bonded methyl radicals in the various siloxane units with silicon-bonded ethyl radicals, although no particular advantage is derived thereform. When silicon-bonded ethyl radicals are present in the fluid, they should be present in an amount no greater than about 10% of the total silicon-bonded methyl and phenyl radicals in methylphenylpolysiloxane fluid (2).

Methylpolysiloxane fluid (3) comprises the well known class of linear or branched chain trimethylsilyl chain-stopped methylpolysiloxanes of the type described in Patents 2,469,880 and 2,469,890, and has a viscosity of from about 100 to 10,000 centistokes when measured at 25° C. Preferably, these fluids comprise trimethylsilyl chain-stopped dimethylpolysiloxanes, although it is possible for a minor amount, e.g., up to about 10 mole percent of the silicon atoms to be present as monomethylsiloxane units, provided a sufficient amount of trimethylsiloxane units are present to insure chain-stopping.

Methylphenylpolysiloxane fluid (4) comprises principally dimethylsiloxane units and methylphenylsiloxane units and has a viscosity of from 100 to 50,000 centistokes at 25° C., with from 2.0% to 6.0% of the total methyl and phenyl radicals being phenyl radicals. Methylphenylpolysiloxane silicone fluid (4) can also contain minor amounts, e.g., up to about 10 mole percent diphenylsiloxane units, monomethylsiloxane units, monophenylsiloxane units, trimethylsiloxane units and triphenylsiloxane units so long as the proportions of the various siloxane units are present in such an amount that the total methyl and phenyl radicals per silicon atom are present in an amount equal to at least 2.0, e.g., from 2.000 to 2.001, and so long as the methyl radicals and phenyl radicals are present in amounts necessary to provide the aforementioned ratio of phenyl radicals to total methyl and phenyl radicals, and so long as the various units are present in proportions to provide a fluid of the previously recited viscosity. Methylphenylpolysiloxane fluid (4) can be modified by the substitution of up to about 10% of the silicon-bonded methyl radicals with silicon-bonded ethyl radicals, although no particular advantage is obtained from such substitution.

The general nature of the various components (1), (2), (3), and (4), which are present in the coating composition of the present invention are critical, and variations in these components will affect the ability of the coating composition to produce a coated cooking utensil having all of the desired properties. For example, when the total organic radicals in methylphenylpolysiloxane resin (1) is greater than about 1.5, it is found that the resulting coating composition does not have the desired abrasion resistance and is therefore subject to mechanical wear. On the other hand, when the total number of organic radicals is below about 1.1, it is found that the resulting coating is sufficiently brittle that it is cracked by severe mechanical shocks. When the ratio of methyl and phenyl radicals is outside of the recited range, it is found that the interaction between the resin and the fluid components of the coating composition are unsatisfactory to provide the desired combination of coatability plus satisfactory release over many cycles.

Variation of methylphenylpolysiloxane fluid (2) outside of the composition and viscosity range previously described affects the interaction between this fluid and methylphenylpolysiloxane resin (1). The specific formulation of methylphenylpolysiloxane fluid (2) is selected so that it has the desired degree of incompatibility with resin (1). With a higher phenyl content than that specified, fluid (2) becomes too compatible with resin (1) and the coating composition fails to provide the desired release. On the other hand, when the precentage of phenyl radicals is below the specified range, fluid (2) becomes almost totally incompatible with resin (1) and causes failure of the release properties of the coating after only a few use cycles. Likewise, variations of the viscosity outside of the stated range has the same adverse effects on the coating composition.

The specific composition and viscosity of methylpolysiloxane fluid (3) is selected to provide a component of the coating composition which is totally incompatible with the other components of the coating composition. This incompatibility promotes the release characteristics of the coating composition and more importantly provides a composition which will uniformly coat the surfaces of cooking utensils and which will readily adhere to such surfaces. The viscosity of the material is selected so that it will not evaporate at the temperatures at which the coated vessel is to be used and so that it is sufficiently viscous to serve its function of allowing a uniform coating.

Methylphenylpolysiloxane fluid (4), which is an optional ingredient, is used to increase the release properties of the coating composition. While the release properties are generally satisfactory without methylphenylpolysiloxane fluid (4) in the composition, it is found that the properties are improved by the presence of fluid (4) and therefore in the preferred embodiment of my invention, fluid (4) is present. Again, the specific chemical nature and viscosity of fluid (4) are selected within the ranges previously described to provide the desired degree of incompatibility with methylphenylpolysiloxane resin (1), the methylphenylpolysiloxane fluid (2) and methylpolysiloxane fluid (3).

The proportions of the various polysiloxanes present in the coating composition of the present invention are relatively critical. The methylphenylpolysiloxane resin (1) is the major component. Methylphenylpolysiloxane fluid (2) must be present in the range previously described, i.e., from 0.5 to 6 parts per 100 parts of resin (1). When the methylphenylpolysiloxane fluid (2) is present in an amount less than 0.5 part or greater than 6 parts, the release properties of the coating composition are adversely affected. When methylpolysiloxane fluid (3) is present in an amount below 0.01 part or more than 0.1 part per 100 parts of resin (1), the coating composition will not form a uniform or adherent coating on the surface of the cooking vessel. Methylphenylpolysiloxane fluid (4) increases the release characteristics of the coating composition of the present invention so long as it is present in an amount no greater than the amount of methylphenylpolysiloxane fluid (2) in the coating composition.

The coating compositions of the present invention are prepared by merely mixing the components thereof, preferably in the presence of a solvent for all of the polysiloxane components of the coating composition. Suitable solvents include, for example, toluene, xylene, perchloroethylene, methylene chloride, mineral spirits, petroleum ethers, and mixtures of solvents of this type. The solids content of these solutions can vary within extremely wide limits, for example, from about 10% to 90% by weight solids. However, for optimum results, the solids content is preferably in the range of from about 20 to 50 percent by weight, based on the weight of the solution. The presence of the solvent not only facilitates the mixing of the components of the composition but also facilitates the application of the coating composition to the article to be coated. The coating can be effected in any conventional manner such as by dipping, brushing, spraying or flooding. After applying the solution to the article to be coated, the article is then heated to a suitable temperature, generally in the range of from about 150 to 350° C. or higher, to effect the cure of the resin.

In order to facilitate the cure of the coating composition, conventional siloxane resin catalysts can be employed. Such catalysts include, for example, metallic salts of organic carboxylic acids such as lead octoate, lead naphthenate, tin octoate, dibutyl tin diacetate, dibutyl tin dilaurate, ferric naphthenate, ferric octoate, cobalt octoate, zinc naphthenate, zinc-2-ethylhexoate, as well as quaternary ammonium and phosphonium compounds such as tetramethyl ammonium hydroxide, tetramethyl ammonium acetate, benzyltrimethyl ammonium hydroxide, trimethylphosphonium hydroxide, tetrabutylphosphonium hydroxide, etc. When a catalyst of the type described above is employed in the coating composition of the present invention, the catalyst is added to the solvent solution of the various organopolysiloxanes in an amount equal to from about 0.5 to 5 parts by weight based on 100 parts of methylphenylpolysiloxane resin (1). The catalyzed solution is merely heated at the curing temperature of from about 150 to 325° C. for a time of from about 1 to 3 hours to produce a coated article, such as a coated cooking utensil.

After the resin is applied to the cooking utensil, the latter may be employed in conventional fashion in the cooking of food articles without the need for using grease. For example, when the coating compositions of the present invention are employed as coating for bread pans, the bread pans may be used to bake over 350 batches of bread before exhibiting any significant decrease in the release property and without any significant buildup of baked product or starch on the surface of the bread pan.

In the evaluation of organopolysiloxane coating compositions for cooking utensils, it has been found that a number of evaluation procedures are available. The most direct evaluation procedure is, of course, to apply the coating composition to the surface of a cooking vessel and to actually use the cooking utensil. When such a cooking utensil is a pan for baking bread, the coated pan, to be satisfactory, should be useful for the baking of from about 350 to 500 or more loaves of bread without having the baked bread stick to the pan and without having any buildup of carbonaceous products on the surface of the pan. It has been discovered, however, that other evaluation procedures are available which eliminate the rather time-consuming uprocess of evaluating the coating composition in an actual baking application. These alternate methods of evaluation have been found to correlate directly with the actual baking evaluation. More particularly, these alternate evaluations comprise the measurement of the coefficient of friction of a bread pan metal surface coated with the organopolysiloxane composition in question at both room temperature and elevated temperatures, and the measurement of abrasion resistance.

The particular coefficient of friction measured is the static coefficient of friction between the coated surface and a 500 gram weight wrapped in cheesecloth at 25° C. and 150° C. Since the coefficient of static friction is a function of the angle at which the bread pan metal surface must be tilted from the horizontal before the weight slips, it is convenient to report this angle rather than convert the angular measurement to the coefficient of friction. It has been found that for satisfactory release of baked bread over 350 bake cycles, the angle of incline should be no more than 10 degrees. Likewise, the angle of incline at 150° C. should be no more than 12 degrees. This slip measurement is conventionally reported as "slip degrees."

Abrasion resistance is measured by reciprocating a cheesecloth-covered one pound weight back and forth over the surface of the bread pan. This weight is a one-quarter inch diameter rod with its axis perpendicular to the surface. The weighted cheesecloth reciprocates at the rate of one cycle per second with a two inch stroke until the weighted cheesecloth seizes the bread pan surface. In this test, the bread pan metal rests upon a horizontal surface and seizure is obtained when the reciprocating, weighted cheesecloth moves the bread pan metal in a horizontal plane. In order to be sufficiently abrasion resistant to survive the better than 350 baking cycles necessary for a satisfactory coating, it is found that seizure must not occur until after about 600 cycles of the weighted cheesecloth.

The following examples are illustrative of the practice of my invention and are not intended for purposes of limitation. All parts are by weight.

In the examples which follow, a number of organopolysiloxane resins were employed. These organopolysiloxanes are characterized as follows:

Methylphenylpolysiloxane resin (1a) is the thermosetting product of hydrolysis of a mixture of methyltrichlorosilane, phenyltrichlorosilane, dimethyldichlorosilane and diphenyldichlorosilane in such proportions that the resin contains a total of 1.4 methyl and phenyl radicals with 43% of the total methyl and phenyl radicals being phenyl radicals.

Methylphenylpolysiloxane resin (1b) is the thermosetting product of hydrolysis and condensation of a mixture of methyltrichlorosilane, phenyltrichlorosilane, dimethyldichlorosilane and diphenyldichlorosilane in such proportions that the resulting resin contains a total of 1.3 methyl and phenyl radicals per silicon atom with 38% of the total methyl and phenyl radicals being phenyl radicals.

Methylphenylpolysiloxane resin (1c) is the product of hydrolysis and condensation of a mixture of methyltrichlorosilane, phenyltrichlorosilane and diphenyldichlorosilane in such proportions that the resulting resin contains an average of 1.1 methyl and phenyl radicals per silicon atom with 40% of the total methyl and phenyl radicals being phenyl radicals.

Methylphenylpolysiloxane resin (1d) is a product prepared by the hydrolysis and condensation of a mixture of methyltrichlorosilane, phenyltrichlorosilane and methylphenyltrichlorosilane in proportions to provide a total of 1.3 methyl and phenyl radicals per silicon atom, 50% of such radicals being phenyl radicals.

In all of the examples which follow, the organopolysiloxane coating composition was prepared from 100 parts by weight of methylphenylpolysiloxane resin (1), various parts by weight of the several polysiloxane fluids, sufficient iron octoate to provide 1% by weight iron based on the weight of the methylphenylpolysiloxane resin (1) and sufficient toluene to provide a solution containing 20% methylphenylpolysiloxane resin (1) solids. The coating composition was applied to the bread pan or bread pan metal by dip coating and the coated article was cured for 3 hours at a temperature of 425° F.

*Example 1*

In this example, the coating composition comprised 100 parts of methylphenylpolysiloxane resin (1a), 0.75 part of a methylphenylpolysiloxane fluid (2) having a viscosity of 34,000 centistokes at 25° C., 0.033 part of a trimethylsilyl chain-stopped dimethylpolysiloxane fluid (3) having a viscosity of 350 centistokes at 25° C. and 0.15 part of a methylphenylpolysiloxane fluid (4) having a viscosity of 5,000 centistokes at 25° C. Methylphenylpolysiloxane fluid (2) was a copolymer of dimethylsiloxane units, diphenylsiloxane units and trimethylsiloxane units. About one out of every 15,000 units was a trimethylsiloxane unit. Ten percent of the total methyl and phenyl radicals were phenyl radicals. Methylphenylpolysiloxane fluid (4) was a copolymer of dimethylsiloxane units, methylphenylsiloxane units and trimethylsiloxane units. About one out of every 2,000 units was a trimethylsiloxane unit. About 4.3 percent of the total methyl and phenyl radicals were phenyl radicals. Bread pans coated with this composition in the previously described manner had a 25° C. slip of 8.0 degrees, a 150° C. slip of 8.0 degrees, had 1200+ strokes abrasion resistance and were satisfactory for the baking of over 450 loaves of bread without failure of release or starch buildup.

*Example 2*

In this example, the same methylphenylpolysiloxane resin (1a), the same methylphenylpolysiloxane fluid (2), the same methylpolysiloxane fluid (3) and the same methylphenylpolysiloxane fluid (4) were employed as in Example 1, except that the ratios of each of the fluids were varied. The coatings were applied to bread pan metal surfaces. The table below presents the parts by weight of each fluid per 100 parts of the resin, the 25° C. and the 150° C. slip and the abrasion resistance in cycles where a satisfactory coating was obtained.

TABLE I

| Run | Fluid (2) Parts | Fluid (3) Parts | Fluid (4) Parts | Slip 25° C. | Slip 150° C. | Abrasion Cycles |
|---|---|---|---|---|---|---|
| 1 | 0.75 | 0.033 | 0.15 | 8.0 | 8.0 | 600+ |
| 2 | 1.50 | 0.033 | 0.15 | 8.0 | 8.5 | 600+ |
| 3 | 3.00 | 0.033 | 0.15 | 8.5 | 8.0 | 600+ |
| 4 | 6.00 | 0.066 | 0.15 | 9.5 | 10.5 | 600+ |
| 5 | 9.00 | 0.033 | 0.15 | 13.0 | 12.0 | 600+ |
| 6 | 12.00 | 0.033 | 0.15 | 14.0 | 12.0 | 600+ |
| 7 | 0.75 | 0.000 | 0.15 | Incomplete Coat | | |
| 8 | 1.50 | 0.000 | 3.00 | Incomplete Coat | | |
| 9 | 3.00 | 0.000 | 1.50 | Incomplete Coat | | |
| 10 | 6.00 | 0.000 | 3.00 | Incomplete Coat | | |
| 11 | 0.75 | 0.011 | 0.15 | 8.5 | 9.0 | 600+ |
| 12 | 0.75 | 0.066 | 0.15 | 8.0 | 8.0 | 600+ |
| 13 | 0.75 | 0.132 | 0.15 | Incomplete Coat | | |
| 14 | 0.75 | 0.033 | 0.00 | 9.0 | 9.5 | 600+ |
| 15 | 3.00 | 0.033 | 0.00 | 8.0 | 8.0 | 600+ |
| 16 | 0.75 | 0.033 | 0.30 | 7.5 | 7.5 | 600+ |
| 17 | 0.75 | 0.033 | 1.50 | Incomplete Coat | | |
| 18 | 0.75 | 0.033 | 3.00 | Incomplete Coat | | |
| 19 | 1.50 | 0.000 | 0.00 | Incomplete Coat | | |
| 20 | 3.00 | 0.000 | 0.00 | Incomplete Coat | | |
| 21 | 6.00 | 0.000 | 0.00 | Incomplete Coat | | |
| 22 | 0.00 | 0.000 | 1.50 | Incomplete Coat | | |
| 23 | 0.00 | 0.000 | 3.00 | Incomplete Coat | | |

As shown in Table I above, bread pan metal surfaces coated with the compositions within the scope of the present invention exhibit satisfactory slip and abrasion resistance and are satisfactory as bread pan coatings for repeated use. However, when the composition is outside of the scope of the presently claimed invention, such material are unsatisfactory. As shown by Runs 7, 8, 9, 10 and 19, 20 and 21, when the methylpolysiloxane fluid (3) is omitted, an incomplete coating is obtained. As shown by Run 13, when the composition contains more than 0.1 part of methylpolysiloxane fluid (3), an incomplete coating is again obtained. As shown by Runs 5 and 6, when more than 6 parts by weight of methylphenylpolysiloxane fluid (2) are present in the coating composition, the slip at 25° C. is above the maximum of 10 degrees therefore the release properties of the coating composition are unsatisfactory. Runs 19 through 21 show that methylphenylpolysiloxane fluid (2) alone is unsatisfactory for release applications. Run 14 shows that even though a satisfactory coating composition can be prepared without methylphenylpolysiloxane fluid (4), the slip is higher than when such fluid is present as shown, for example, by Run No. 1. Runs 17 and 18 illustrate the fact that the coating compositions are unsatisfactory when the amount of methylphenylpolysiloxane fluid (4) in the composition is greater than the amount of methylphenylpolysiloxane fluid (2). Runs 22 and 23 show that when methyl phenylpolysiloxane fluid (4) is the only fluid in the composition, the resulting material is unsatisfactory for release applications.

Example 3

In this example, the methylphenylpolysiloxane resin (1), the methylpolysiloxane fluid (3) and the methylphenylpolysiloxane fluid (4) were the same ones employed in Example 1 and in the same proportions. Methylphenylpolysiloxane fluids (2) employed in this Example 3 comprised a number of different fluids, each of which was employed in the amount of 0.75 part per 100 parts of the resin and each of which was a copolymer of dimethylsiloxane units and diphenylsiloxane units and containing only about one trimethylsiloxane unit per 15,000 units to provide a viscosity of about 34,000 centistokes at 25° C. The ratio of dimethylsiloxane units and diphenylsiloxane units was varied to provide different percentages of phenyl radicals based on the total number of methyl and phenyl radicals present in the fluid. In Table II below are presented the percent of the total methyl and phenyl radicals which were phenyl radicals, the slip at 25° C. and 150° C. and the abrasion resistance.

TABLE II

| Run | Fluid (2) Percent Phenyl | Slip 25° C. | Slip 150° C. | Abrasion Cycles |
|---|---|---|---|---|
| 24 | 5.8 | 8.5 | 8.5 | 600+ |
| 25 | 6.8 | 7.5 | 9.0 | 600+ |
| 26 | 8.5 | 7.5 | 9.5 | 600+ |
| 27 | 10.0 | 8.0 | 8.0 | 600+ |
| 28 | 11.5 | 9.5 | 11.5 | 600+ |
| 29 | 13.0 | 9.5 | 11.5 | 600+ |

All of the organopolysiloxane coating compositions of Runs 24 through 29 are within the scope of the present invention and are satisfactory as coatings for cooking articles.

Example 4

When the procedure of Example 1 was repeated except that the 100 parts of methylphenylpolysiloxane resin (1a) of Example 1 was replaced with 100 parts of methylphenylpolysiloxane resin (1b), a coated bread pan was produced which had a 25° C. slip of 7.0 degrees, a 150° C. slip of 8.0 degrees and an abrasion resistance of 600+ cycles, indicating that this coating composition is suitable as a coating for cooking utensils.

Example 5

When the procedure of Example 1 was repeated except that the 100 parts by weight of methylphenylpolysiloxane resin (1a) was replaced by 100 parts by weight of previously described methylphenylpolysiloxane resin (1c), the resulting bread pan had a 25° C. slip of 6.5, a 150° C. slip of 7.0 and 600+ cycles in the abrasion resistance test, indicating that the resin was satisfactory as a coating for cooking utensils.

Example 6

When the procedure of Example 1 was repeated except that the 100 parts of methylphenylpolysiloxane resin (1a) was replaced by 100 parts of the previously described methylphenylsiloxane resin (1d), bread pans coated with this composition exhibited a 25° C. slip of 9.0 degrees, a 150° C. slip of 10.5 degrees and 600+ cycles abrasion resistance, and were therefore satisfactory as a coating composition for cooking utensils.

Example 7

When the procedure of Example 6 was repeated except that the 350 centistoke methylpolysiloxane fluid (3) was replaced with an equal weight of a trimethylsilyl chain-stopped dimethylpolysiloxane having a viscosity of 1,000 centistokes at 25° C., a 25° C. slip of 8.0 degrees, a 150° C. slip of 8.5 degrees and an abrasion resistance of 600+ cycles was obtained, indicating that the composition was useful as a coating for cooking vessels.

Example 8

When the procedure of Example 6 was repeated except that the methylpolysiloxane fluid (3) was replaced with an equal weight of a 3,500 centistoke silanol chain-stopped dimethylpolysiloxane, it was impossible to apply a uniform adherent coating to a bread pan surface.

Example 9

When the procedure of Example 6 was repeated except that methylphenylpolysiloxane fluid (2) was omitted, the resulting coated pan exhibited a 25° C. slip of 6.5 degrees, a 150° C. slip of 16.5 degrees and an abrasion resistance of 225 cycles. The high 150° C. slip and the poor abrasion resistance showed that this composition, which was outside of the scope of the present invention, is unsatisfactory for use as a coating on a cooking utensil.

What I claim as new and desire to secure by Letters Patent of the United States is:

1. An organopolysiloxane composition consisting essentially of, by weight, (1) 100 parts by weight of a methylphenylpolysiloxane resin containing an average of from about 1.1 to 1.5 total methyl and phenyl radicals per silicon atom with from about 30 to 70 percent of the total methyl and phenyl radicals being phenyl radicals, (2) from 0.5 to 6 parts of a methylphenylpolysiloxane fluid comprising principally dimethylsiloxane units and diphenylsiloxane units and having a viscosity of from about 5,000 to 500,000 centistokes at 25° C. and containing an average of at least 2.0 total methyl and phenyl radicals per silicon atom with about 5 to 20 percent of the total methyl and phenyl radicals being phenyl radicals, (3) from about .01 to 0.10 part by weight of a trimethylsilyl chain-stopped methylpolysiloxane fluid having a viscosity of from about 100 to 10,000 centistokes at 25° C. and (4) up to about 6 parts by weight and no more than the amount of component (2) of a methylphenylpolysiloxane fluid comprising principally dimethylsiloxane units and methylphenylsiloxane units and having a viscosity of from about 100 to 50,000 centistokes at 25° C. and containing an average of at least 2.0 total methyl and phenyl radicals per silicon atom with from about 2.0 to 6.0 percent of the total methyl and phenyl radicals being phenyl radicals.

2. A coating composition consisting essentially of, by weight, (1) 100 parts of a methylphenylpolysiloxane resin containing an average of from about 1.1 to 1.5 total methyl and phenyl radicals per silicon atom with from about 30 to 70 percent of the total methyl and phenyl radicals being phenyl radicals, (2) from about 0.5 to 6 parts of a methylphenylpolysiloxane fluid comprising principally dimethylsiloxane units and diphenylsiloxane units and having a viscosity of from about 5,000 to 500,000 centistokes at 25° C. and containing an average of at least 2.0 total methyl and phenyl radicals per silicon atom with about 5 to 20 percent of the total methyl and phenyl radicals being phenyl radicals and (3) from about 0.01 to 0.1 part of a trimethylsilyl chain-stopped methylpolysiloxane fluid having a viscosity of from about 100 to 10,000 centistokes at 25° C.

References Cited by the Examiner
UNITED STATES PATENTS

| | | | |
|---|---|---|---|
| 2,462,242 | 2/1949 | Webb et al. | 260—46.5 |
| 2,606,510 | 8/1952 | Collings | 260—46.5 |
| 2,833,441 | 5/1958 | Hedlund | 260—29.1 |
| 3,002,946 | 10/1961 | Thomas | 260—29.1 |

MORRIS LIEBMAN, *Primary Examiner.*

A. O. DENT, B. A. AMERNICK, *Assistant Examiners.*